(12) United States Patent
Takefuji et al.

(10) Patent No.: US 6,773,511 B2
(45) Date of Patent: Aug. 10, 2004

(54) MOLDED PRODUCT, PARTING SURFACE COVERING MASKS AND PRODUCING METHODS OF THE SAME

(75) Inventors: Tomohiro Takefuji, Niwa-gun (JP); Akio Ono, Niwa-gun (JP); Koji Ishii, Niwa-gun (JP); Takemichi Yamauchi, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 149 days.

(21) Appl. No.: 09/993,902

(22) Filed: Nov. 27, 2001

(65) Prior Publication Data

US 2002/0064635 A1 May 30, 2002

(30) Foreign Application Priority Data

Nov. 27, 2000 (JP) ........................................ 2000-359146

(51) Int. Cl.[7] ............................................. B05C 11/00
(52) U.S. Cl. ........................ 118/504; 118/301; 118/505; 427/282
(58) Field of Search .................... 425/96, 98; 264/130; 427/135, 272, 282; 118/213, 301, 504, 505

(56) References Cited

U.S. PATENT DOCUMENTS

| | | | | |
|---|---|---|---|---|
| 4,533,568 A | * | 8/1985 | McClinton et al. | 427/135 |
| 4,940,012 A | * | 7/1990 | Zimmerman et al. | 118/301 |
| 6,548,000 B1 | * | 4/2003 | Gobled et al. | 264/129 |

* cited by examiner

Primary Examiner—Richard Crispino
Assistant Examiner—Michelle Acevedo Lazor
(74) Attorney, Agent, or Firm—Nixon Peabody LLP

(57) ABSTRACT

A molded product which is free of flash resulting from application of a coating agent or the like, parting surface covering masks for preventing the flash, and producing methods of these. The mask is mounted to each of a lower mold and an upper mold, so as to cover parting surfaces which are at inner side than a rim molding portion and cover their vicinities. Adjusting portions are attached to a mask body of the mask, and are capable of correspondingly getting tight contact with the parting surfaces. Accordingly, even when the coating agent is applied to the each mold by using a spray gun or the like in this state, the coating agent is not applied to the parting surfaces and their vicinities.

11 Claims, 12 Drawing Sheets

F I G. 1
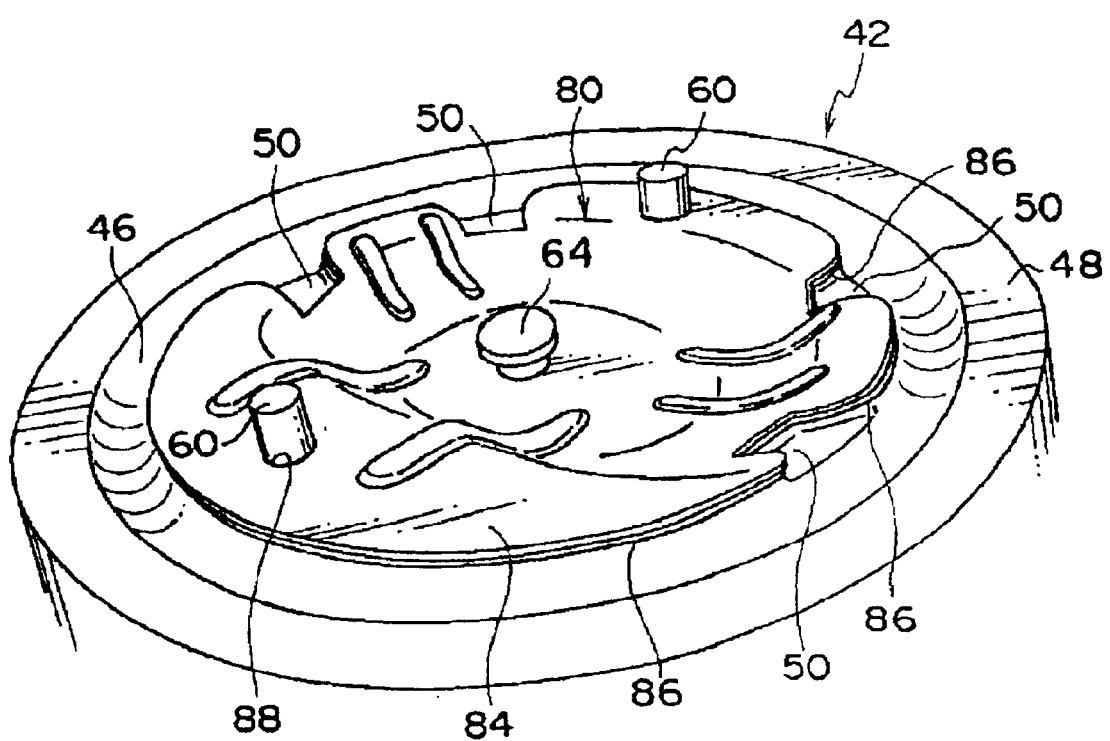

F I G. 2
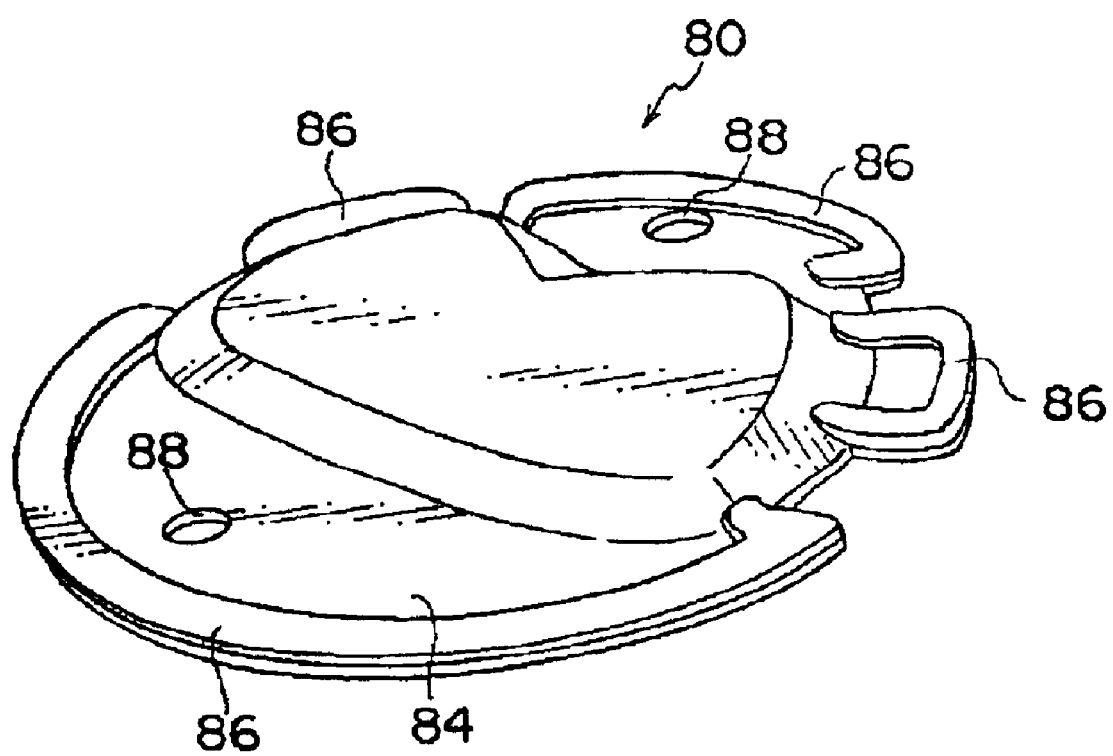

F I G. 3
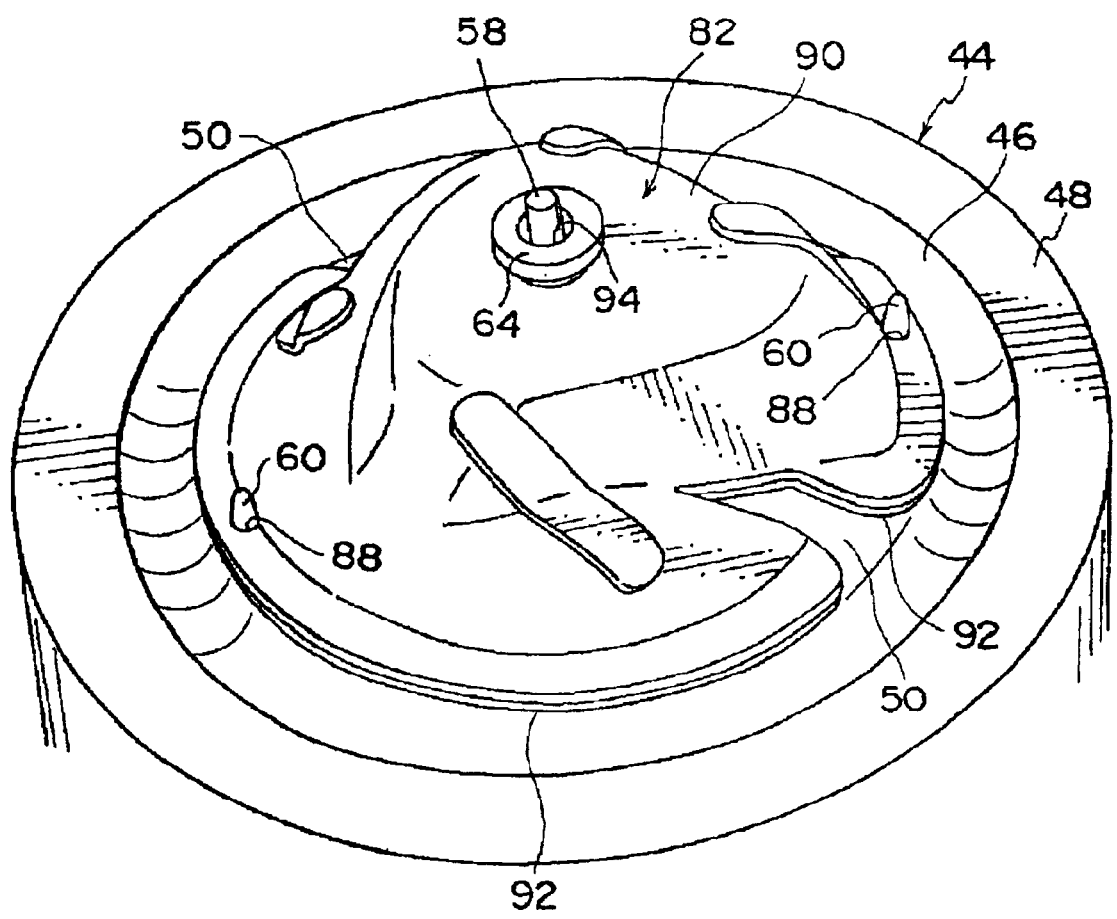

F I G. 4
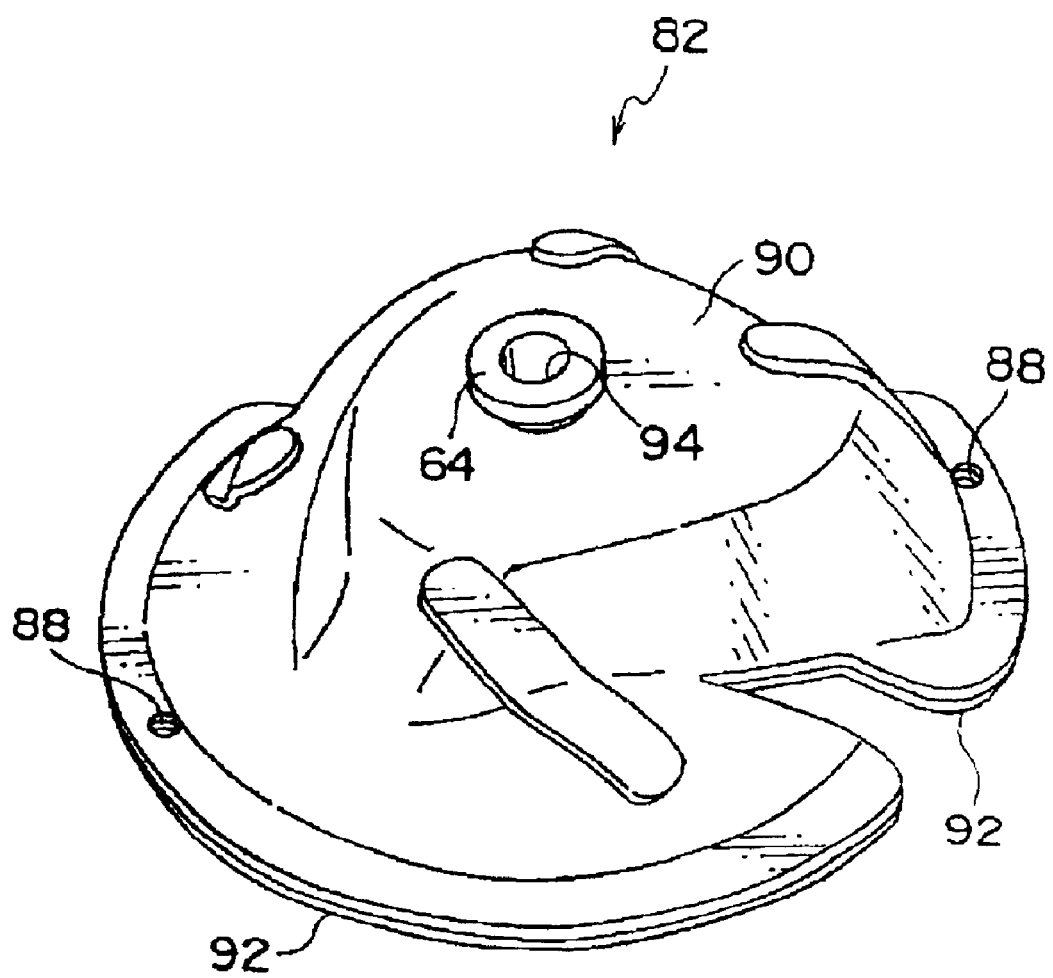

F I G. 8 A
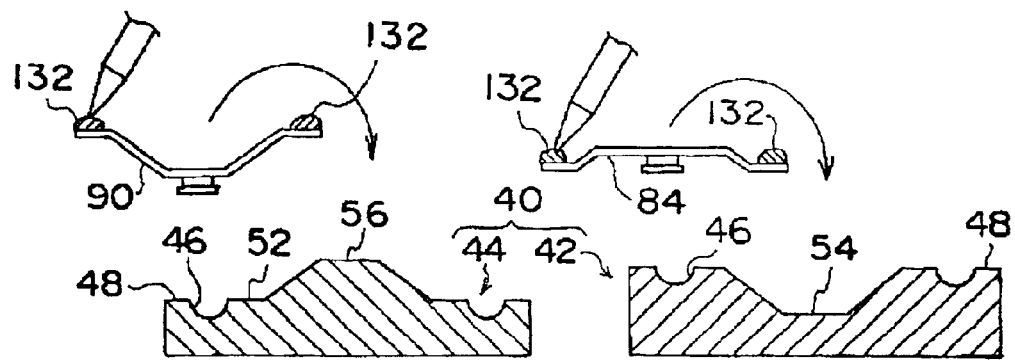
F I G. 8 B
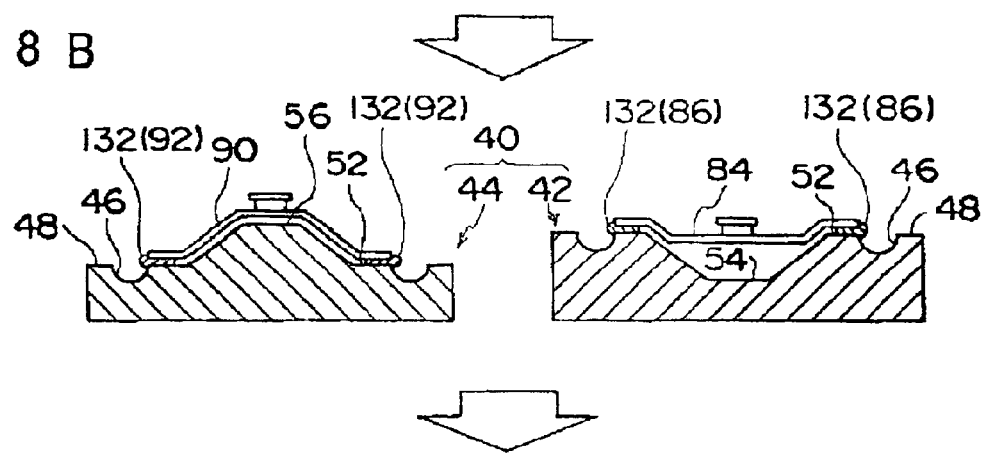
F I G. 8 C
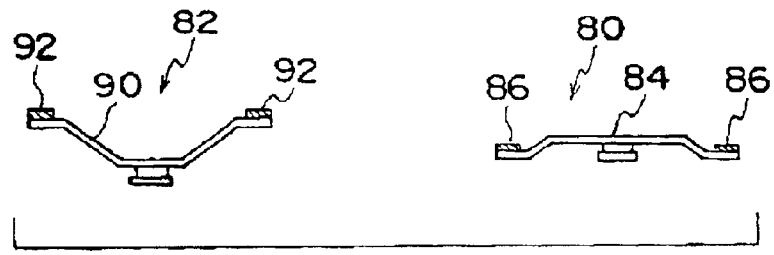

MOLDED PRODUCT, PARTING SURFACE COVERING MASKS AND PRODUCING METHODS OF THE SAME

BACKGROUND OF THE INVENTION

1. Field of the Invention

The present invention relates to a molded product in which a coating or the like is applied on a surface of a skin portion or the like of a steering wheel, parting surface covering masks for using to mold the product, and producing methods of these.

2. Description of the Related Art

A steering wheel of a vehicle generally includes a core metal, which is composed of a ring-shaped rim, a boss that is provided at the center of the rim and is disposed at a position in an axial direction of the rim, and spokes that integrally connect the rim and the boss. Further, resin molding using a synthetic resin material such as a urethane resin is provided in the core metal around portions of the rim and around spokes.

The resin molding for the core metal uses a kind of insert molding. Namely, the resin molding is provided at predetermined portions of the core metal, e.g., the rim, by mounting the core metal to a mold corresponding to portions of the core metal at which the resin molding is provided, and by filling a molten synthetic resin material into the mold after the core metal has been mounted to the mold.

At present, a coating mainly intended to improve weather-resistance and wear-resistance is applied on surfaces of the resin molding portions of the steering wheel. The coating is generally formed on the surfaces of the resin molded portions after the resin molding has been completed, by applying a coating agent to an internal peripheral surface of a cavity of the mold by a spray gun or the like when the resin molding is conducted.

Since the coating agent is sprayed on the mold by the spray gun or the like as described above, the coating agent is applied not only to the cavity but also to a parting line (parting surfaces of the mold). The coating agent applied to the parting line remains as flash such as a flange at the steering wheel after the molding has been completed. Therefore, a cutting operation for the flash has been required. This causes a problem of increased operation processes, and thus, increased cost.

SUMMARY OF THE INVENTION

In view of the above facts, an object of the present invention is to obtain a molded product which is free of the flash resulting from application of the coating agent or the like, parting surface covering masks for preventing the flash, and producing methods of the molded product and the parting surface covering masks.

A first aspect of the present invention is a molded product comprising: a molded body, which is formed by filling a molding material into molds composed of a plurality of molding member components, with molding portions being formed at some of the molding member components; and a coating, which is formed on surfaces of the molded body by a predetermined coating agent; wherein the coating is formed by mounting masks to coated-portion molding members of some of the plural molding member components before the molding material is filled, the coated-portion molding members corresponding to portions of the molded body to which the coating is applied, the masks being capable of covering parting surfaces of the coated-portion molding members and being formed by using the mold-shapes of the coated-portion molding members; applying the coating agent to the molding portions of the coated-portion molding members in the state in which the masks have been mounted; and removing the masks from the coated-portion molding members after the coating agent has been applied, clamping the molds together, and molding the molded body.

In the molded product having the above structure, the coating is applied on at least a portion of the surface of the molded body which is formed of the molding material. The coating is formed; by applying the coating agent to the molding portions of the coated-portion molding members, which correspond to the portions of the molded body to which the coating is applied, of a plurality of molding member components such as core molds, cavity molds and plate molds, which compose the mold used to mold the molded body, and by filling the molding material into the mold in the state in which the coating agent has been applied.

When the coating agent is applied to the molding portions of the coated-portion molding members in order to mold the molded product, the masks formed by using shapes of the coated-portion molding members are mounted onto the parting surfaces of the coated-portion molding members so as to cover the parting surfaces. Therefore, when the coating agent is applied in the state in which the parting surfaces have been covered with the masks, the coating agent is applied to the molding portions and the masks, but not to the parting surfaces covered with the masks. In other words, the coating agent which would be applied to the parting surfaces if the masks were not mounted is applied to the masks when the masks are mounted. Accordingly, when the masks are removed from the coated-portion molding members, the coating agent remains essentially only at the molding portions of the coated-portion molding members. Further, when the molding material is filled into the mold in the state in which the coating agent has been applied only to the molding portions, so as to mold the molded body, the coating is applied onto the surface of the molded body.

As described above, according to the present invention, the coating agent is not applied to the parting surfaces, because the coating agent which would be applied to the parting surfaces if the masks were not mounted is applied to the masks. Therefore, after the molding has been completed, the coating agent does not remain as flash or the like, which would result from application of the coating agent to the parting surfaces. Accordingly, a removing operation for the flash formed of the coating agent can be eliminated, and thus, producing processes can be considerably reduced.

In the present invention, the coating (and the coating agent) merely needs to be formed as a film or as a layer/layers on the surface of the molded body, and does not need limited functions and effects. The coating may be intended to provide various functions and effects, for example, weather-resistance, wear-resistance, antibacterial properties and reinforcement. Further, the coating (and the coating agent) may be intended to provide color paint, and colorless paint so-called clear paint for glaze or the like, or to decorate the molded body.

In the present invention, the molding material for forming the molded body does not need limited properties or forms (liquid, solid, powder or the like), and the molding material may be a synthetic resin material used for resin molding or a metal powder used for powder metallurgy molding or the like.

A second aspect of the present invention is a method for producing a molded product, wherein a coating comprising a predetermined coating agent is applied on a surface of a molded body formed by filling a molding material into a mold, the method comprising the steps of: a) mounting masks onto parting surfaces of coated-portion molding members of some of plural molding member components which compose the mold, with molding portions that mold the molded body being formed at some of the molding member components, the coated-portion molding members corresponding to portions of the molded body to which the coating is applied, the masks being capable of covering the parting surfaces of the coated-portion molding members and being formed by using the mold-shape of the mold of the coated-portion molding members; b) applying the coating agent to the molding portions of the coated-portion molding members in the state in which the masks have been mounted; c) removing the masks from the coated-portion molding members after the coating agent has been applied; and d) filling the molding material into the mold.

In the producing method of the molded product having the above structure, in the mask mounting process prior to the molding material filling process, the masks formed by using shapes of the coated-portion molding members are mounted to the coated-portion molding members which molds the portions of the molded body to which the coating is applied, so as to cover the parting surfaces of the coated-portion molding members.

Then, in the applying process, the coating agent is applied to the molding portions of the coated-portion molding members. At this time, for example, if the coating agent is applied by a spray gun or the like in consideration of application efficiency (e.g., operation efficiency and uniformity of application), the coating agent is applied not only to the molding portions but also to surrounding vicinities thereof. However, since the parting surfaces of the coated-portion molding members have been covered with the masks, the coating agent which would be applied to the parting surfaces of the coated-portion molding members is essentially applied to the masks, and the coating agent is not applied to the parting surfaces of the coated-portion molding members.

Further, in the mask removing process after the applying process, the masks are removed from the coated-portion molding members.

After that, the molding material is filled into the mold so as to mold the molded body. At this time, since the coating agent has been applied to the molding portions of the coated-portion molding members, the coating agent adheres to the surface of the molded body molded in the mold, such that the coating is formed on the surface of the molded body.

In the producing method of the molded product, the coating agent, which would be applied to the parting surfaces of the coated-portion molding members if the mask mounting process in which the masks are mounted to the coated-portion molding members, is applied to the masks by mounting the masks are mounted to the parting surfaces of the coated-portion molding members. Thus, even when the masks are removed in the mask removing process after the applying process, the coating agent has not been applied to the parting surfaces of the coated-portion molding members. Therefore, after the molding has been completed, the coating agent does not remain as flash or the like, which results from application of the coating agent to the parting surfaces. Accordingly, a removing operation for the flash formed of the coating agent can be eliminated, and thus, producing processes can be considerably reduced.

In the present invention, the coating (and the coating agent) merely needs to be formed like a film or a layer/layers on the surface of the molded body, and does not need limited functions and effects. The coating may be intended to provide various functions and effects, for example, weather-resistance, wear-resistance, antibacterial property and reinforcement. Further, the coating (and the coating agent) may be intended to provide color paint, and colorless paint so-called clear paint for glaze or the like, or to decorate the molded body.

In the present invention, the molding material for forming the molded body does not need limited properties or forms (liquid, solid, powder or the like), and the molding material may be a synthetic resin material used for resin molding or a metal powder used for powder metallurgy molding or the like.

A third aspect of the present invention is a mask for covering parting surfaces, the mask being mountable to coated-portion molding members corresponding to portions of a molded body surface on which a coating is formed, before a molding material which forms the molded body is filled into a mold composed of a plurality of molding member components, with molding portions being formed at some of the molding member components, the mask having a shape that corresponds to the surface shape of the coated-portion molding member, wherein the mask is formed by using the coated-portion molding member, and covers parting surfaces of the coated-portion molding member in the state in which the mask is mounted to the coated-portion molding member.

The parting surface covering masks having the above structure are formed by using shapes of the coated-portion molding members, so that the masks can be mounted to the coated-portion molding members corresponding to portions of the molded body on which the coating is applied.

When the parting surface covering masks are mounted to the coated-portion molding members before the molding material is filled into the mold, the parting surfaces of the coated-portion molding members are covered with the parting surface covering masks. In this state, when the coating agent forming the coating is applied to the coated-portion molding members by a spray gun or the like, the coating agent adheres to the molding portions of the coated-portion molding members, and to the surrounding vicinities of the molding portions, i.e., the parting surface covering masks.

When the parting surface covering masks are removed from the coated-portion molding members after the coating agent has been applied, the coating agent essentially remains only at the molding portions of the coated-portion molding members, and the coating agent does not remain at the parting surfaces. After that, when the coated-portion molding members are clamped together in the state in which the parting surface covering masks have been removed from the coated-portion molding members, and the molding material is filled into the mold so as to mold the molded body, the coating is applied only to portions of the surface of the molded body corresponding to the molding portions of the coated-portion molding members.

Since the coating agent does not adhere to the parting surfaces by mounting the parting surface covering masks to the coated-portion molding members when the coating agent is applied as described above, flash, which results from molding the molded body after the coating agent has been applied to the parting surfaces, are not formed at the molded body. Accordingly, a removing operation for the flash formed of the coating agent used for molding can be eliminated, and thus, producing processes can be considerably reduced.

Preferably, the mask for covering parting surfaces of the present invention further comprise: mask bodies, whose peripheries correspond to peripheries of the parting surfaces and whose portions facing the parting surfaces are formed in correspondence with the parting surfaces; and adjusting portions, which are fixed to at least the peripheries or the facing portions of the mask bodies, and whose portions fixed to the mask bodies are formed in correspondence with shapes of the parting surfaces.

The parting surfaces covering mask having the above structure is composed of a mask body and adjusting portions. The periphery of the mask body corresponding to the peripheries of the parting surfaces and the portions thereof facing to the parting surfaces are formed in correspondence with the parting surfaces. The portions of the adjusting portions fixed to the mask body, i.e., to at least the facing portions or the periphery of the mask body, are formed in correspondence with the parting surfaces.

When there are a plurality of molding member components which mold the identical portion of the identical molded body (for example, in order to keep spare components or to produce the same type of molded body in large quantities), the shapes of the molding member components are slightly different from each other due to dimensional error or the like.

Therefore, even when the coated-portion molding members are essentially the same types, parting surface covering masks corresponding to the respective coated-portion molding members are required. Since the parting surface covering masks have a structure in which the adjusting portions are fixed to the mask bodies, if essentially the same mask bodies are used for the respective coated-portion molding members, and the adjusting portions are adjusted so as to be suitable for the respective coated-portion molding members, the mask bodies can be produced in large quantities. Accordingly, even when the parting surface covering masks are prepared for the respective coated-portion molding members, production cost for the parting surface covering masks can be reduced, and thus, the entire production cost can be also reduced.

Also, if the essential shapes of the coated-portion molding members are identical or similar to each other for other applications or other types of molding, the production cost for the parting surface covering masks can be reduced, because the same mask bodies can be used.

Further, in the present invention, the periphery of the mask body may correspond to external peripheries of the parting surfaces, or to internal peripheries thereof.

Preferably, in the mask for covering parting surfaces of the present invention, the adjusting portions are formed by time-hardening members harden after an elapse of predetermined period of time, wherein the time-hardening members can tightly contact the mask bodies, can be plastically deformed and partially cut off by an external force applied thereof, and are integrally bonded to the mask bodies by hardening while adhering to the mask bodies.

In the parting surfaces covering mask having the above structure, the adjusting portions are formed by the time-hardening members. Namely, when the adjusting portions are formed, the mask body is set on the parting surfaces of the coated-portion molding member in the state in which the time-hardening members are attached at the predetermined positions on the mask body, and the time-hardening members are plastically deformed by adding an external force in the state in which the mask body is set, so as to correspond to the parting surfaces.

Then, unnecessary time-hardening members are cut off before or after time-hardening members are hardened, and thereby the parting surfaces covering mask corresponding to the coated-portion molding member on which the mask has been set is formed. When the adjusting portions are formed of the time-hardening members in this manner, the parting surface covering masks corresponding to the respective coated-portion molding members can be formed with considerable ease. Accordingly, the production cost for the parting surface covering masks can be further reduced, and thus, the entire production cost can be also further reduced.

In the present invention, cure time of the time-hardening member is not particularly limited. Essentially, a time-hardening member having a relative short cure time or that having a relative long cure time may be used. When the time-hardening member having a short cure time is used, time for producing the parting surface covering masks can be reduced, and thus, the parting surface covering masks can be rapidly used. On the other hand, when the time-hardening member having a long cure time is used, even if a long operation time is required by a unskilled operator, the parting surface covering masks can be reliably made to correspond to the coated-portion molding members.

Preferably, the mask for covering the parting surfaces of the present invention further comprise engaging portions, which engage with predetermined portions of the coated-portion molding members in the state in which the masks being mounted to the coated-portion molding members such that the masks are held by the coated-portion molding members.

In the parting surfaces covering mask having the above structure, when the parting surfaces covering mask is mounted to the coated-portion molding member, the engaging portions provided at the parting surfaces covering mask engage with predetermined portions of the coated-portion molding member, such that the parting surfaces covering mask is held by the coated-portion molding member. Accordingly, the parting surfaces covering mask is easily positioned at the coated-portion molding member, and thus, operation efficiency is improved.

A fourth aspect of the present invention is a method for producing masks for covering parting surfaces, the masks being mountable to coated-portion molding members, the coated-portion molding members being members of plural molding member components which compose a mold for molding a molded product having a surface coated, and which include molding portions for molding the coated portions of a molded body, the masks covering parting surfaces of the coated-portion molding members in the state in which the masks are mounted to the coated-portion molding members, the masks preventing a coating agent applied to the molding portions from adhering to the parting surfaces before the coated-portion molding members are clamped together; the method comprising the steps of: a) molding mother-molds corresponding to the parting surfaces, by laminating a mother-mold molding member, which reaches a predetermined rigidity after hardening, to the parting surfaces of the coated-portion molding members, and to predetermined portions of the coated-portion molding members except the molding portions to which the coating agent is applied, and molding the mother-mold molding member along the parting surfaces and the predetermined portions of the coated-portion molding members; b) producing mask-forming molds including mask-forming portions whose peripheries correspond to peripheries of the mother-molds by tightly attaching a mold-forming member to substantially all peripheries of the mother-molds; and c)

molding at least mask bodies of the masks covering the parting surfaces by filling a mask-molding material into the mask-forming molds.

In the producing method of the parting surface covering masks having the above structure, initially, in the mother-mold molding process, a mother-mold molding member is laminated to the parting surfaces of the coated-portion molding members including the molding portions for molding portions of the molded body to which the coating is applied, and to predetermined portions of the molding portions except the portions on which the coating agent is applied, and the mother-mold molding member is molded along the parting surfaces of the coated-portion molding members and the predetermined portions thereof except the molding portions to which the coating agent is applied. When the molded mother-mold molding member has been hardened, the mother-molds (masters) are formed.

Then, in the mold producing process, the mask-forming molds are produced. In this process, the mold forming member which forms the mask-forming molds is attached to the substantially entire peripheries of the mother-molds. Further, when the mold forming member which has been attached to the mother-molds (i.e., the mask-forming molds before the mother-molds are removed) is split to remove the mother-molds, the mask-forming portions whose internal peripheries correspond to the external peripheries of the mother-molds are formed at the portions in which the mother-molds have been accommodated.

In the next mask molding process, the mask molding material is filled into the mask-forming molds, i.e., to the mask-forming portions. As a result, at least mask bodies of the parting surface covering masks are molded.

In this manner, in the producing method of the parting surface covering masks, the mother-molds are molded by using the coated-portion molding members which mold the molded product, and further, the mask-forming molds are formed using the mother-molds. Therefore, the outer shapes of the parting surface covering masks can be formed with considerable ease so as to be identical or very similar to the shapes of the parting surfaces of the coated-portion molding members, and thus, the production cost for the parting surface covering masks can be reduced. Further, since the parting surface covering masks can be easily produced in large quantities by using the mask-forming molds repeatedly, unit cost for producing the parting surfaces covering mask can be reduced.

The production cost for the parting surface covering masks affects the production cost for the molded product. Thus, when the parting surface covering masks are produced by using the producing method of the present invention, the production cost for the molded product can be reduced.

In the present invention, the peripheries of the mother-molds may be external peripheries or internal peripheries thereof.

Preferably, in the producing method of the parting surface covering masks of the present invention, a mold-filling member, which is plastically deformed by a predetermined amount or more of external force, is laminated to vicinities of the parting surfaces of the coated-portion molding members such that the vicinities of the parting surfaces are formed in predetermined shapes, before the mother-molds are molded.

In the producing method of the parting surface covering masks having the above structure, the mold-filling member laminating process is conducted prior to the mother-mold molding process. In the mold-filling member laminating process, the mold-filling member, which is plastically deformed by a predetermined amount or more of external force, is laminated to the vicinities of the parting surfaces of the coated-portion molding members, such that the mold-filling member is formed in predetermined shapes.

As a result, at the portions of the coated-portion molding members to which the mold-filling member has been laminated, irregularity of the molding portions of the coated-portion molding members is covered with the mold-filling member, such that the coated-portion molding members have relatively simple shapes. Since the purpose of the parting surface covering masks is to cover the parting surfaces so that the coating agent is not applied to the parting surfaces, as long as the parting surface covering masks attain the purpose, the shapes thereof are not limited. Thus, the parting surface covering masks merely need irregularity corresponding to the molding portions formed at the coated-portion molding members, so as to cover the parting surfaces.

In the producing method of the present invention, as described above, at the portions of the coated-portion molding members to which the mold-filling member has been laminated, irregularity, which is unnecessary for the parting surface covering masks, of the molding portions of the coated-portion molding members to which the coating agent is not applied, is covered with the mold-filling member. Therefore, the coated-portion molding members will have simple shapes. When the mother-mold molding member is laminated to the parting surfaces of the coated-portion molding members and to the laminated mold-filling member, unnecessary irregularity is not formed in the mother-molds.

Therefore, unnecessary irregularity is not formed in the mask-forming molds which are formed based on the mother-molds, and further, unnecessary irregularity is not formed in the parting surface covering masks which are formed based on the mask-forming molds. Accordingly, the mother-mold molding member and the mask molding material can be saved, and thus, the production cost can be reduced and the parting surface covering masks can be lightened.

Preferably, the producing method of the parting surface covering masks of the present invention further comprises the steps of: attaching adjusting members, which are plastically deformed by at least a predetermined amount of external force, to at least one of peripheries of the mask bodies and portions of the mask bodies facing the parting surfaces; and forming the adjusting members in correspondence with shapes of surfaces of the coated-portion molding members by pressing the mask bodies toward the coated-portion molding members in a state in which the mask bodies to which the adjusting members being attached are temporarily mounted to the coated-portion molding members.

In the producing method of the parting surface covering masks having the above structure, in the adjusting members attaching process, the adjusting members are integrally attached to at least the peripheries of the mask bodies or the portions of the mask bodies facing to the parting surfaces, which have been molded through the mask molding process. Then, in the adjusting member forming process, the mask bodies to which the adjusting members have been attached are temporarily mounted to the coated-portion molding members, and the mask bodies are pressed toward the coated-portion molding members.

The adjusting members are plastically deformed by a predetermined amount or more of external force. Therefore, when the mask bodies are pressed toward the coated-portion molding members, due to pressing force from the mask bodies and reactive force from the coated-portion molding members, the adjusting members which have been attached to the mask bodies are plastically deformed so as to have shapes corresponding to the surfaces of the coated-portion molding members. Since the adjusting members have been plastically deformed so as to have shapes corresponding to the surfaces of the coated-portion molding members in this manner, the parting surface covering masks are mounted to the coated-portion molding members without gaps therebetween.

Accordingly, even when the coating agent is applied to the coated-portion molding members by a spray gun or the like, the coating agent will not enter between the parting surface covering masks and the coated-portion molding members.

BRIEF DESCRIPTION OF THE DRAWINGS

FIG. 1 is a perspective view of a mask for a lower mold according to an embodiment of the present invention, showing a state in which the mask is mounted to the lower mold.

FIG. 2 is a perspective view showing an external appearance of the mask for the lower mold according to the embodiment of the present invention.

FIG. 3 is a perspective view of a mask for an upper mold according to the embodiment of the present invention, showing a state in which the mask is mounted to the upper mold.

FIG. 4 is a perspective view showing an external appearance of the mask for the upper mold according to the embodiment of the present invention.

FIG. 8A is a schematic view of a process of producing the masks, showing an adjusting members attaching process.

FIG. 8B is a schematic view of a process of producing the masks, showing an adjusting member forming process.

FIG. 8C is a schematic view of a process of producing the masks, showing a state in which the masks have been completed.

DESCRIPTION OF THE PREFERRED EMBODIMENTS

Structure of Embodiment

Figure 5:
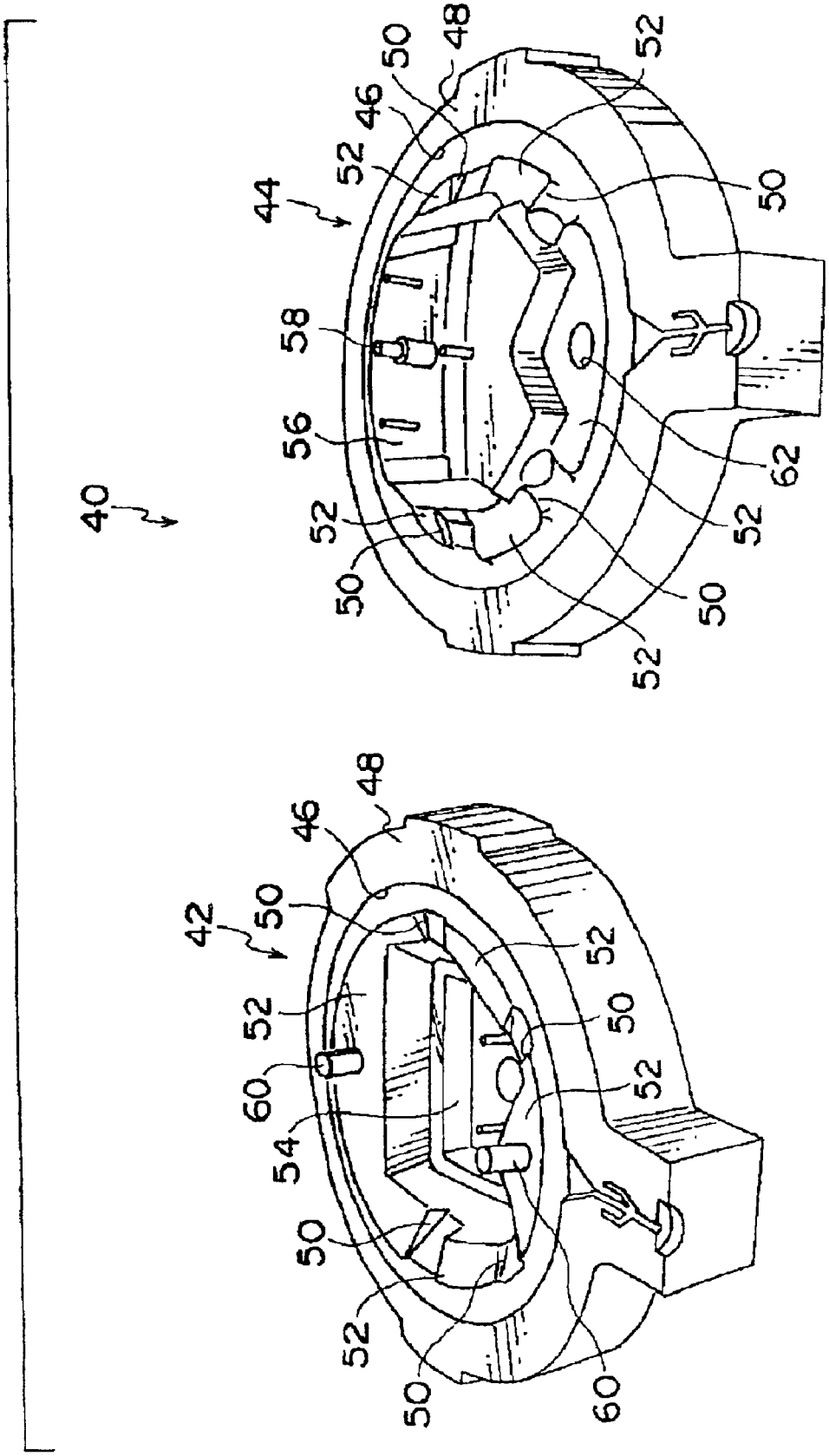
FIG. 5 is a perspective view of the molds.

In the following, a steering wheel 10 according to an embodiment of the present invention, which is a molded product, parting surface covering masks 80 and 82 (hereinafter, referred to as "masks 80 and 82") according to an embodiment of the present invention, and a mold 40 used to form a skin portion 20, which is a molded body, around a core metal 12 of the steering wheel 10, will be respectively described in their structures. The relations between the steering wheel 10 and the masks 80 and 82 will be described in a producing process of the steering wheel 10.

Structure of Steering Wheel 10

Figure 11:
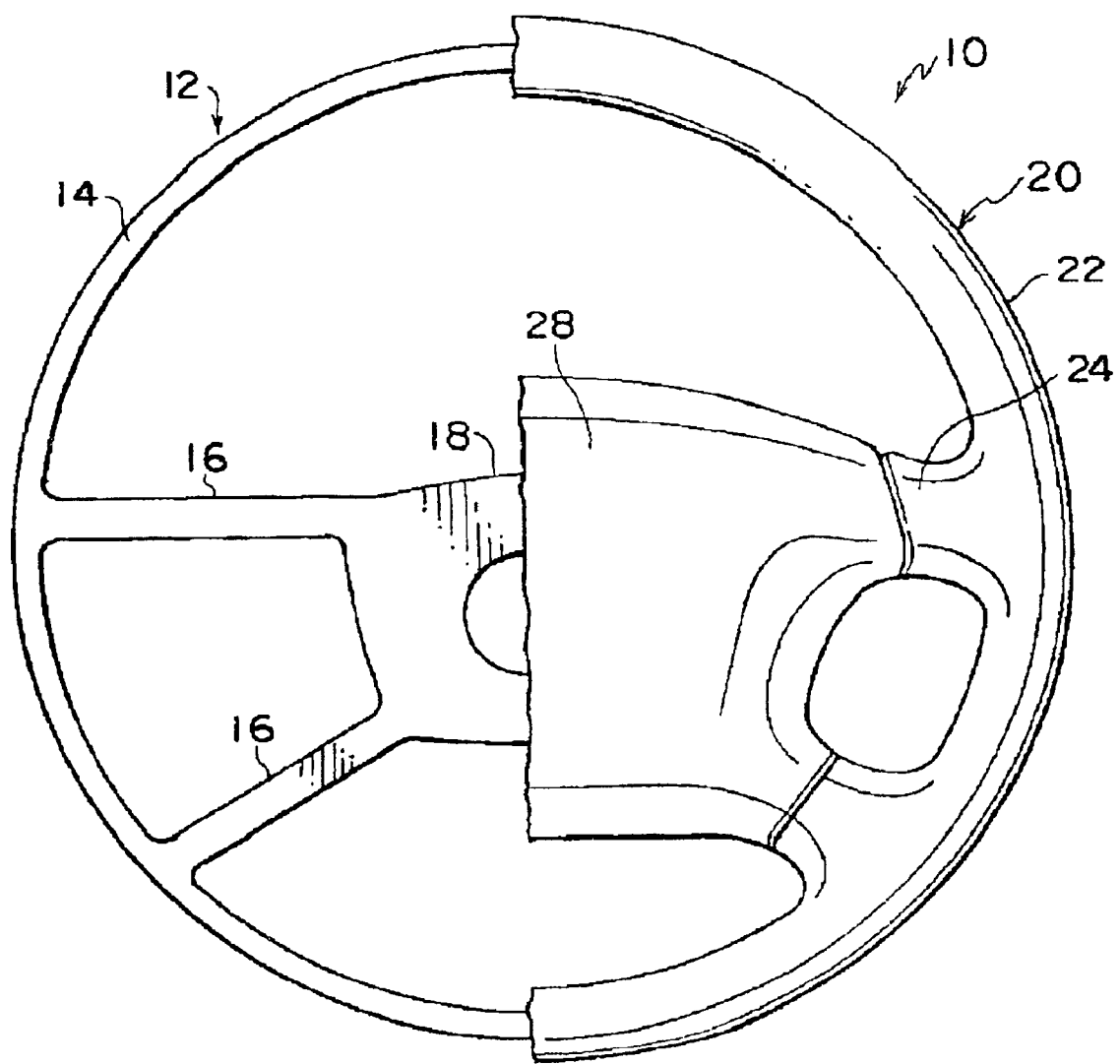
FIG. 11 is a plan view of the steering wheel, which is a molded product according to the embodiment of the present invention.

FIG. 11 shows a structure of the steering wheel 10 in a plan view. Further, FIG. 12 shows essential elements of the steering wheel 10 in a cross-sectional view.

Figure 12:
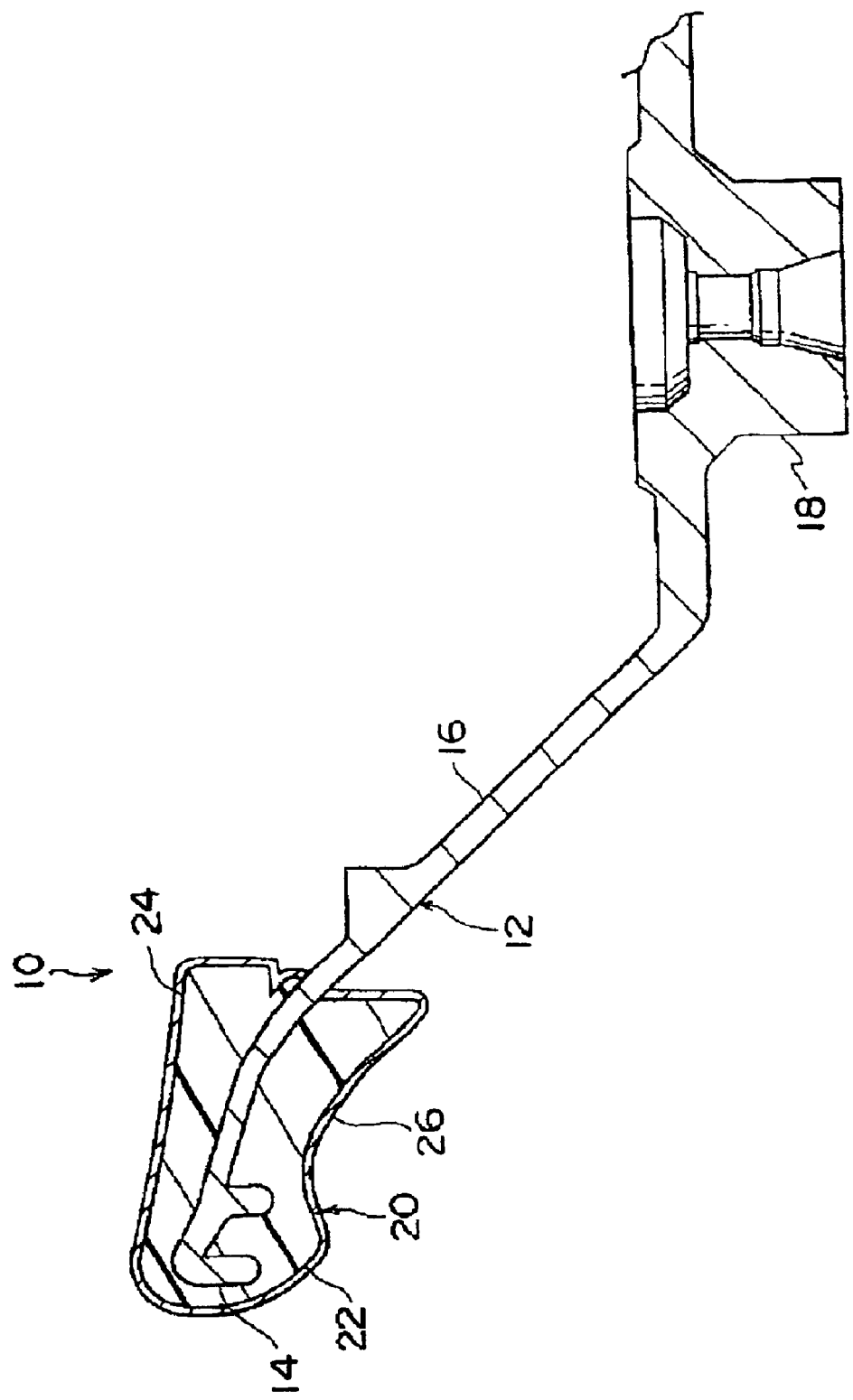
FIG. 12 is a cross-sectional view of the steering wheel, which is the molded product according to the embodiment of the present invention.

As shown in FIGS. 11 and 12, the steering wheel 10 has a rim 22 and a spoke 24. The core metal 12 which is a core metal of the steering wheel 10 includes a rim core metal 14 which is a component of the rim 22, spoke core metals 16 which are a component of the spoke 24, and a boss 18. The rim core metal 14 of the core metal 12 has a ring shape in the plan view (see FIG. 11) and a substantially U-shape opening toward an axial direction of the rim core metal 14 in the cross-sectional view (see FIG. 12). At a substantially central portion of the rim core metal 14 which is formed in a ring shape, a substantially cylindrical boss 18 which is substantially coaxial with the rim core metal 14 is provided at a position which is displaced in the axial direction of the rim core metal 14. A plurality of spoke core metals 16 (four spoke core metals 16 in this embodiment) are extended from the rim core metal 14 toward the boss 18. Each end of the spoke core metals 16 is connected to the inside of the boss 18 at an inner side in a radial direction of the rim core metal 14. A leading end of an unillustrated steering shaft is passed through and fixed to the boss 18.

Further, the skin portion 20 which is molded out of a synthetic resin material such as an urethane resin is provided around the rim core metal 14 and around each portion of the spoke core metals 16 at the rim core metal 14 side than a longitudinal direction intermediate portion of the spoke core metal 16. Namely, the rim core metal 14 and the portions of the spoke core metals 16 are covered with the skin portion 20. Although the details will be described later, the skin portion 20 is formed by filling the mold 40 shown in FIG. 5 with a molten synthetic resin material in a state in which the core metal 12 is disposed in the mold 40, and by hardening the synthetic resin material in the state in which the mold 40 is filled with the synthetic resin material. The rim core metal 14 and a portion of the skin portion 20 corresponding to the rim core metal 14 form the rim 22 of the steering wheel 10, and the spoke core metals 16 and portions of the skin portion 20 corresponding to the spoke core metals 16 form the spoke 24 of the steering wheel 10.

As shown in FIG. 12, a coating 26 having weather-resistance and wear-resistance is applied to the outside of the skin portion 20. The coating 26 is exaggerated in the illustration of FIG. 12. However, in practice, the coating 26 formed at the external periphery of the skin portion 20 is very thin. Although the details will be described later, the coating 26 is formed on a surface of the skin portion 20 by applying a coating agent 136 in advance, which forms the coating 26, to the inner side of the mold 40 which is used when the skin portion 20 is molded, and by filling the mold 40 with the synthetic resin material and hardening the material.

In the steering wheel 10 having the above-described structure, as shown in FIG. 11, a steering pad 28 is provided inside the rim 22, and integrally connected to the steering wheel 10 by an unillustrated fastener. The steering pad 28 is provided with a switch for an audible horn, an air bag system and the like.

Structure of Mold 40

Next, a structure of the mold 40 will be briefly described using FIG. 5.

As shown in FIG. 5, the mold 40 includes a lower mold 42 and an upper mold 44. The coating agent 136 forming the coating 26 is applied to the molds, and the molds serve as coated-portion molding members (including molding member components). Each of the molds has a block or thick plate shape, and is formed in a substantially circular shape in a plan view. A rim molding portion 46 molding the rim 22 is formed at each of the lower mold 42 and the upper mold 44. The rim molding portions 46 are substantially annular cavities in a plan view (recessed portions for molding) and are substantially coaxial with an external periphery of the lower mold 42. Further, the rim molding portions 46 correspond to the rim core metal 14 of the core metal 12. When the lower mold 42 and the upper mold 44 are put together so that the opening sides of the rim molding portions 46 face each other, a cross-sectional shape of the rim molding portions 46 is equal to that of a portion of the skin portion 20 corresponding to the rim 22.

In each of the lower mold 42 and the upper mold 44, a portion located more to a radial direction outer side than the rim molding portion 46 is a parting surface 48. When molding the skin portion 20, the lower mold 42 and the upper mold 44 are put together so that the parting surface 48 of the lower mold 42 and that of the upper mold 44 contact each other.

Further, a plurality of spoke molding portions 50 molding the spoke 24 are formed at each of the lower mold 42 and the upper mold 44. The spoke molding portions 50 are cavities (recessed portions for molding) corresponding to the spoke core metals 16, and each end of the spoke molding portions 50 at the rim molding portion 46 side communicates with the rim molding portion 46. When the rim molding portion 46 of the lower mold 42 and that of the upper mold 44 face each other, the spoke molding portions 50 of the lower mold 42 and those of the upper mold 44 also face each other, and the spoke core metals 16 corresponding to the cavities are disposed.

In each of the lower mold 42 and the upper mold 44, portions which are inwards of the rim molding portion 46 and at lateral sides of the spoke molding portions 50 are parting surfaces 52. When molding the skin portion 20, the lower mold 42 and the upper mold 44 are put together so that the parting surfaces 52 of the lower mold 42 and those of the upper mold 44 contact each other.

A concave accommodating portion 54 is formed at the center of the lower mold 42, and each portion of the spoke core metals 16 at the boss 18 side than the longitudinal direction intermediate portion of the spoke core metal 16, i.e., a portion of the core metal 12 around which the skin portion 20 is not formed, is accommodated in the accommodating portion 54. In correspondence with the accommodating portion 54, a convex portion 56 is formed at the upper mold 44. When the lower mold 42 and the upper mold 44 are put together, the convex portion 56 is inserted into the accommodating portion 54, and the boss 18 and each portion of the spoke core metals 16 at the boss 18 side than the longitudinal direction intermediate portion of the spoke core metal 16 are nipped and held between the convex portion 56 and an internal periphery of the accommodating portion 54. Further, a pin 58 for positioning is provided at the convex portion 56. The pin 58 is formed in correspondence with a hole for inserting a steering shaft, which is formed at the boss 18. When the core metal 12 is mounted to the mold 40, the pin 58 is inserted into the hole of the boss 18 to position the core metal 12 with respect to the mold 40.

Further, a pair of guide pins 60 are provided on the parting surfaces 52 of the lower mold 42. The guide pins 60 are provided at both sides of the accommodating portion 54 so as to be opposite to each other. A pair of guide holes 62 corresponding to the guide pins 60 are formed on the parting surfaces 52 of the upper mold 44. When the lower mold 42 and the upper mold 44 are put together, the guide pins 60 are inserted into the guide holes 62, respectively.

Structure of Masks 80 and 82

Next, each structure of the masks 80 and 82 will be described.

FIG. 2 shows a perspective view of the mask 80, and FIG. 1 shows a perspective view of the mask 80 which has been mounted to the lower mold 42.

As shown in FIGS. 1 and 2, the mask 80 includes a mask body 84 which is molded out of a hard synthetic resin material. In a plan view, the shape of the mask body 84 corresponds to the shape of a surface of the lower mold 42 on the parting surfaces 52 side excluding the parting surface 48, the rim molding portion 46 and the spoke molding portions 50. However, in a cross-sectional view, only portions of the mask body 84 facing the parting surfaces 52 correspond to the parting surfaces 52, and portions of the mask body 84 facing the accommodating portion 54 are sufficiently shallower and more smoothly curved than the accommodating portion 54.

Adjusting portions 86 are provided at the mask body 84. The adjusting portions 86 are integrally fixed to an external periphery of the mask body 84 and to portions thereof facing the parting surfaces 52 of the lower mold 42. Surfaces of the adjusting portions 86 facing the lower mold 42 are molded in correspondence with the surfaces of the parting surfaces 52 of the lower mold 42 which they face. When the mask 80 is mounted to the lower mold 42, the adjusting portions 86 overlap the parting surfaces 52 so that substantially no gap exists therebetween. In this embodiment, the adjusting portions 86 are fixed to the external periphery of the mask body 84. However, for example, when openings corresponding to external peripheries of the rim molding portions 46 are formed at the masks 80 and 82 in order to cover the parting surfaces 48 of the lower mold 42 and the upper mold 44 with the masks 80 and 82, the adjusting portions 86 may be fixed to internal peripheries of the lower mold 42 and the upper mold 44.

Further, holes 88, which are engaging portions corresponding to the guide pins 60 of the lower mold 42, are formed at the mask body 84. When the mask 80 is mounted to the lower mold 42, the guide pins 60 are inserted into the holes 88.

FIG. 4 shows a perspective view of the mask 82, and FIG. 3 shows a perspective view of the mask 82 which has been mounted to the upper mold 44.

As shown in FIGS. 3 and 4, the mask 82 includes a mask body 90 which is molded out of a hard synthetic resin material. In a plan view, the shape of the mask body 90 corresponds to the shape of a surface of the upper mold 44 at the parting surfaces 52 side excluding the parting surface 48, the rim molding portion 46 and the spoke molding portions 50. In a cross-sectional view, although the shape of the mask body 90 is along the parting surfaces 52 and the convex portion 56, at least a portion thereof corresponding to the convex portion 56 is not complicatedly formed as the convex portion 56 but more smoothly formed than the convex portion 56.

Adjusting portions 92 are provided at the mask body 90. The adjusting portions 92 are integrally fixed to an external periphery of the mask body 90 and to portions thereof facing the parting surfaces 52 of the upper mold 44. Surfaces of the adjusting portions 92 facing the upper mold 44 are molded in correspondence with the surfaces of the parting surfaces 52 of the upper mold 44 which they face. Therefore, when the mask 82 is mounted to the upper mold 44, the adjusting portions 92 overlap with the parting surfaces 52 having substantially no gap therebetween.

Further, a hole 94, which is an engaging portion corresponding to the pin 58 of the upper mold 44, is formed at the mask body 90. When the mask 82 is mounted to the upper mold 44, the pin 58 is inserted into the hole 94.

As shown in FIGS. 1 and 3, a gripping portion 64 is provided at each of the masks 80 and 82. The gripping portions 64 are integrally fixed by putty or the like at substantially central portions of surfaces of the masks 80 and 82 opposite to surfaces thereof which are in contact with the lower mold 42 and the upper mold 44 when the masks 80 and 82 are mounted to the lower mold 42 and the upper mold 44, respectively. Gripping the gripping portions 64 when the masks 80 and 82 are mounted to and removed from the lower mold 42 and the upper mold 44 enables the operation efficiency to be improved. In this embodiment, one gripping portion 64 is provided at the substantially central portion of the surface of the each mask opposite to the surface thereof which is in contact with the each mold when the mask is mounted to the mold. However, the structure of the gripping portion 64 is not limited to this. The gripping portion 64 may be provided at a position away from the central portion of the each mask depending upon the shape and size of the mask, or a plurality of gripping portions 64 may be provided at each mask. Further, the gripping portions 64 do not necessarily need to be provided.

Operation and Effect of Embodiment

Producing Process for Masks 80 and 82

Next, operation and effects of production of the masks 80 and 82 will be described through a producing process for the masks 80 and 82.

When the masks 80 and 82 are produced, masters 110 and 112 serving as mother-molds for the masks 80 and 82 are initially formed. The lower mold 42 and the upper mold 44 corresponding to the masks 80 and 82 are used to form the masters 110 and 112.

Figure 6A:
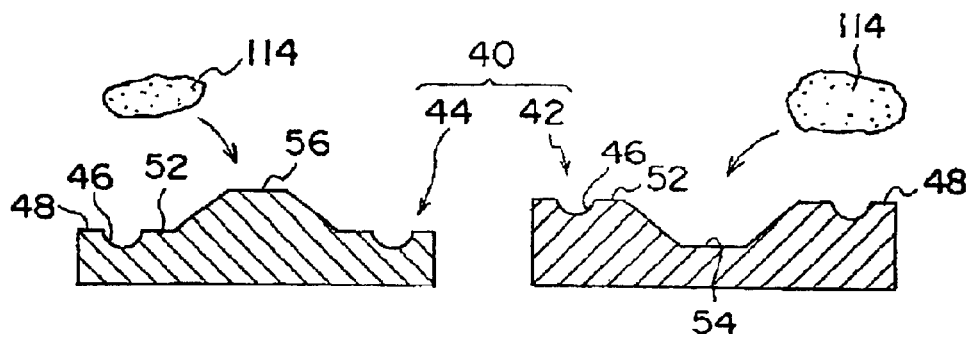
FIG. 6A is a schematic view of a process of producing the masks, showing a state immediately before a mold-filling member laminating process.
Figure 6B:
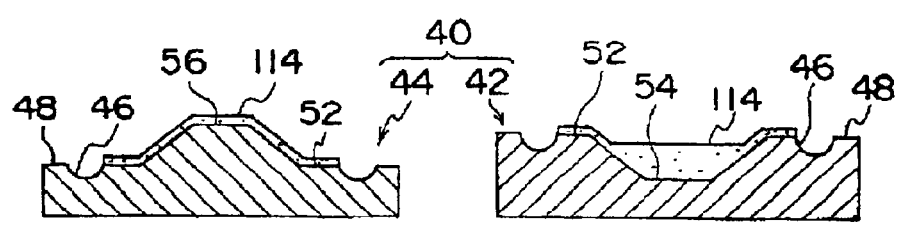
FIG. 6B is a schematic view of a process of producing the masks, showing the mold-filling member laminating process.

First, as shown in FIG. 6A, in a mold-filling member laminating process, clay 114, which is a mold-filling member, is temporarily filled into the accommodating portion 54 of the lower mold 42 up to a level near the parting surfaces 52. At this time, at the opening end side of the accommodating portion 54, the clay 114 is molded so as to have a flat surface or a smoothly curved surface. Accordingly, as shown in FIG. 6B, when the lower mold 42 is viewed including the clay 114, the accommodating portion 54 which has been a relatively large recessed portion before filling the clay 114 cannot be apparently viewed, and the clay 114 has the same flat surface as the parting surface 48 or the curved surface with a relatively smooth and shallow curve. Further, as shown in FIG. 6A, the clay 114 is also applied onto the convex portion 56 of the upper mold 44. The applied clay 114 is molded so as to have, for example, a smoothly curved surface (see FIG. 6B).

In the mold-filling member laminating process, the clay 114 is used as the mold-filling member applied to the lower mold 42 and the upper mold 44. However, the mold-filling member does not necessarily need to be clay. In other words, any members, which are plastically deformed with ease by a predetermined amount or more of external force (e.g., human physical force), which can be suitably attached to the lower mold 42 and the upper mold 44, and which can be removed from the lower mold 42 and the upper mold 44 even after some periods of time have elapsed, can be used as the mold-filling member in place of the clay 114.

Figure 6C:
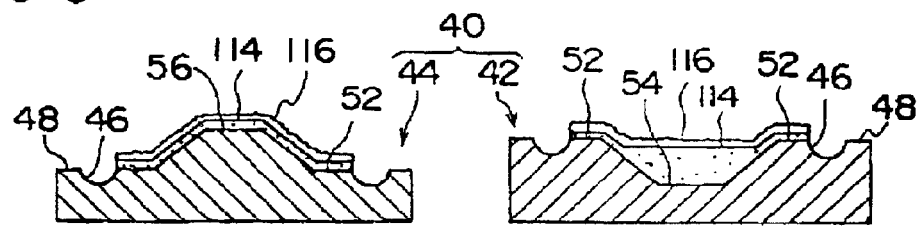
FIG. 6C is a schematic view of a process of producing the masks, showing a mother-mold molding process.

Then, in a master molding process, as shown in FIG. 6C, FRP (fiber reinforced plastic) 116 serving as a mother-mold molding member, which can be plastically deformed with relative ease before hardening, is applied onto the clay 114 corresponding to the parting surfaces 52 and the accommodating portion 54 of the lower mold 42 so as to have a predetermined thickness. Further, the FRP 116 applied to the lower mold 42 via the clay 114 is molded so that an external periphery of the FRP 116 is slightly more inward in a radial direction of the lower mold 42 than external peripheries of the parting surfaces 52 in a plan view of the lower mold 42.

As described above, the clay 114 is filled into the accommodating portion 54 of the lower mold 42 so as to be molded. Accordingly, a portion of the FRP 116 corresponding to the accommodating portion 54 has a surface which is conformable to the surface of the clay 114 onto which the FRP 116 has been applied. As a result, the entire FRP 116 has a flat plate shape or a smooth curved saucer shape.

As shown in FIG. 6C, the FRP 116 is also applied onto the clay 114 corresponding to the parting surfaces 52 and the convex portion 56 of the upper mold 44 so as to have a predetermined thickness. Further, the FRP 116 applied to the upper mold 44 via the clay 114 is molded so that an external periphery of the FRP 116 is slightly more inward in a radial direction of the upper mold 44 than external peripheries of the parting surfaces 52 in a plan view of the upper mold 44.

As described above, the clay 114 is applied onto the convex portion 56 of the upper mold 44 so as to be molded. Accordingly, the surface of the clay 114 is a surface with a relatively smooth curve different from that of the convex portion 56. As a result, a portion of the FRP 116 corresponding to the convex portion 56 has a surface with a relatively smooth curve at the convex portion 56 side.

When the applied and molded FRP 116 has been hardened, the FRP 116 is removed from each of the lower mold 42 and the upper mold 44. After the hardened FRP 116 has been removed, the applied clay 114 is removed from each of the lower mold 42 and the upper mold 44.

Figure 6D:
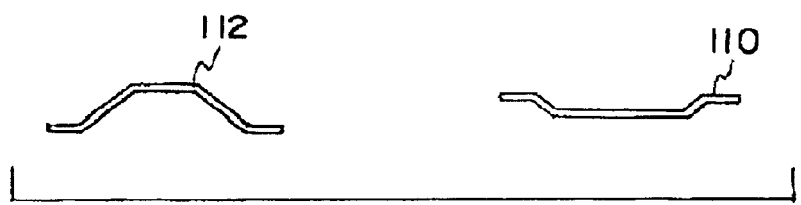
FIG. 6D is a schematic view of a process of producing the masks, showing a state in which mother-molds have been removed from the molds.

Further, in a mother-mold finishing process, an adjusting member such as putty is fixed to the hardened FRP 116, and the FRP 116 including the adjusting member is finely polished and shaped by a router or a file. This polishing and shaping operations eliminate unnecessary irregularities from the FRP 116. After the irregularities have been eliminated from the FRP 116, a thick reinforcing portion is integrally formed by an adjusting member such as putty at a surface of the hardened FRP 116 opposite to a surface thereof facing the parting surface 48, and then, a coating is applied onto the reinforced surface. Through these processes, as shown in FIG. 6D, the masters 110 and 112 corresponding to the masks 80 and 82 are formed.

Next, in a mold producing process, mask-forming molds 120 and 122 are formed by using the masters 110 and 112.

Figure 7A:
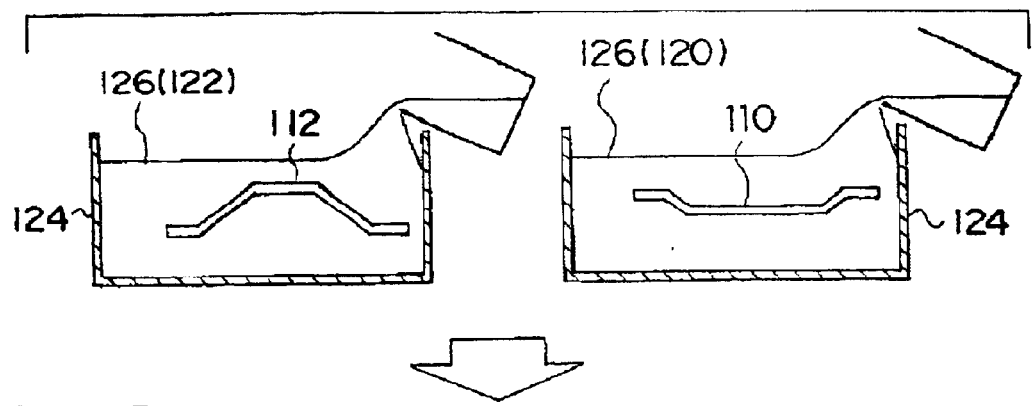
FIG. 7A is a schematic view of a process of producing the masks, showing a mold producing process.

In the mold producing process, as shown in FIG. 7A, in a state in which each of the masters 110 and 112 is accommodated in a substantially box-shaped molding form 124 whose upper end is opened, a silicone resin 126, which is a mold forming member, is filled into the molding form 124, and the silicone resin 126 is hardened. The hardened silicone resin 126 is removed from the molding form 124, and the silicone resin 126 is split in a thickness direction of the each master embedded in the silicone resin 126. When each of the masters 110 and 112 is taken out of the silicone resin 126, the mask-forming molds 120 and 122 whose inner surfaces correspond to outer surfaces of the masters 110 and 112 are formed.

As described above, the FRP 116 (the masters 110 and 112) is polished and shaped by a router or a file so as to eliminate unnecessary irregularities from the FRP 116. Therefore, unnecessary convex portions of the FRP 116 (the masters 110 and 112) are not caught in the hardened silicone resin 126, and the silicone resin 126 is not caught in unnecessary concave portions of the FRP 116 (the masters 110 and 112). Accordingly, each of the masters 110 and 112 can be smoothly taken out of the hardened silicone resin 126.

Figure 7B:
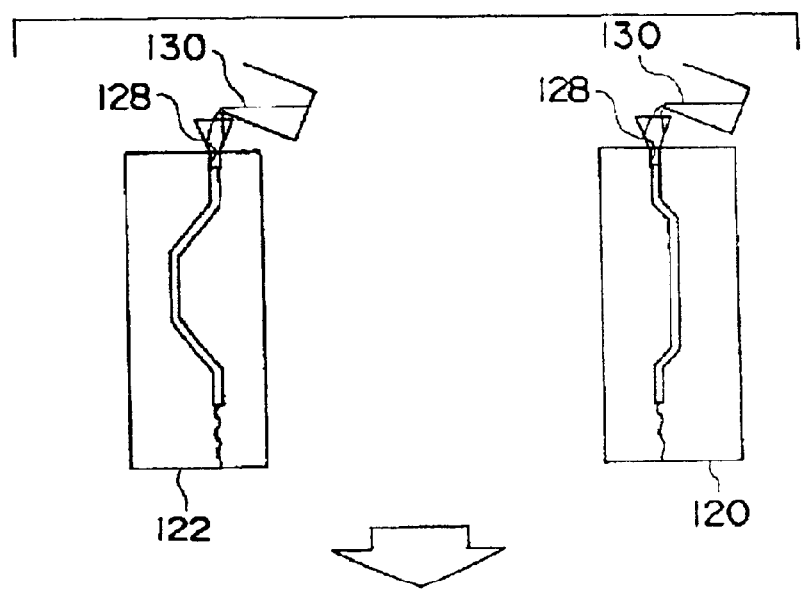
FIG. 7B is a schematic view of a process of producing the masks, showing a mask molding process.
Figure 7C:
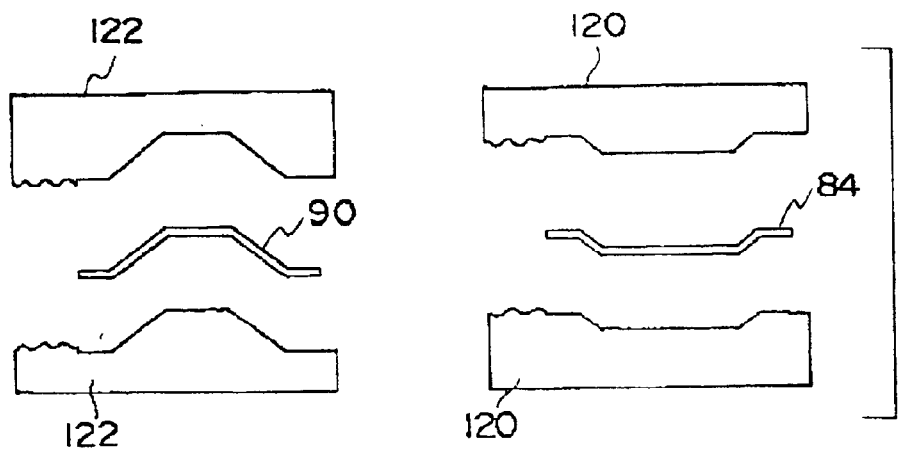
FIG. 7C is a schematic view of a process of producing the masks, showing a state in which mask bodies are removed from the molds after the mask molding process has been completed.

In a body molding process which is a mask molding process, a resin inlet 128 is formed at each of the mask-forming molds 120 and 122, and each of the split mask-forming molds 120 and 122 is clamped, so that a synthetic resin material 130 which hardens as time elapses is injected from the resin inlet 128 (see FIG. 7B). When the synthetic resin material 130 injected into each of the mask-forming molds 120 and 122 has been hardened therein, each of the mask-forming molds 120 and 122 is split again so that the hardened synthetic resin material 130, i.e., each of the mask bodies 84 and 90, may be taken out (see FIG. 7C).

As described above, the masters 110 and 112 are polished and shaped by a router or a file so as to eliminate unnecessary irregularities from the masters 110 and 112. Therefore, unnecessary irregularities are not formed at the hardened silicone resin 126 (the mask-forming molds 120 and 122) nor at the mask bodies 84 and 90.

Further, the holes 88 and 94 are formed at the mask bodies 84 and 90 taken out of the mask-forming molds 120 and 122, and unnecessary portions such as flash formed at the mask bodies 84 and 90 are eliminated.

In this embodiment, the mask-forming molds 120 and 122 are formed by using the masters 110 and 112, and the mask bodies 84 and 90 are formed by using the mask-forming molds 120 and 122. However, for example, the masters 110 and 112 may be used as the mask bodies 84 and 90. In this case, there is an advantage in that the mask-forming molds 120 and 122 do not need to be formed. However, when a plurality of pairs of the mask bodies 84 and 90 are formed, if the masters 110 and 112 are used as the mask bodies 84 and 90, each pair of the mask bodies 84 and 90 (i.e., the masters 110 and 112) needs to be polished and shaped by a router or a file. On the other hand, in this embodiment, the mask bodies 84 and 90 can be formed merely by injecting the synthetic resin material 130 into each of the mask-forming molds 120 and 122 so as to be hardened. In this case, since the masters 110 and 112 have been polished and shaped in advance by a router or a file, the mask bodies 84 and 90 normally do not need to be polished and shaped. Accordingly, the mask bodies 84 and 90 (i.e., the masks 80 and 82) can be easily and inexpensively produced in large quantities.

Next, adjusting members are attached to the mask bodies 84 and 90. As shown in FIG. 8A, in an adjusting members attaching process, time-hardening members 132 serving as the adjusting members such as putty, which harden after a predetermined period of time has elapsed, are attached to portions of the mask bodies 84 and 90 which face the parting surfaces 52 of the lower mold 42 and the upper mold 44 when the masks 80 and 82 are mounted to the lower mold 42 and the upper mold 44, and to external peripheries of the mask bodies 84 and 90. The time-hardening members 132 can be plastically deformed and also partially cut off in a desired shape when a predetermined amount of external force, for example, human physical force, is applied. As a result, the adjusting portions 86 are formed at the mask body 84, and the adjusting portions 92 are formed at the mask body 90.

Then, in an adjusting member forming process, the mask bodies 84 and 90 to which the time-hardening members 132 have been attached are temporarily mounted to the lower mold 42 and the upper mold 44, respectively (see FIG. 8B). When the mask bodies 84 and 90 are pressed toward the lower mold 42 and the upper mold 44 in this state, the time-hardening members 132 tightly contact the parting surfaces 52 and their vicinities of the lower mold 42 and the upper mold 44 while being plastically deformed in correspondence with the shapes thereof. After that, the mask bodies 84 and 90 are removed from the lower mold 42 and the upper mold 44, and the time-hardening members 132 are hardened. As a result, the adjusting portions 86 and 92 are formed at the mask bodies 84 and 90 such that the masks 80 and 82 are formed (see FIG. 8C).

Further, the gripping portion 64 is integrally fixed by putty or the like to each of the masks 80 and 82 which have been formed in the above processes.

As described above, in this embodiment, the masters 110 and 112 serving as bases for the masks 80 and 82 are formed by using the lower mold 42 and the upper mold 44. Therefore, the masks 80 and 82 which are conformable to the lower mold 42 and the upper mold 44 can be easily formed.

When there is a plurality of sets of the mold 40, even if the molds 40 are intended to mold the skin portion 20 of the identical steering wheel 10, for example, the shapes of the parting surfaces 52 of the molds 40 are slightly different from each other due to dimensional error. However, in this embodiment, as described above, the time-hardening members 132 are pressed in tight contact with the parting surfaces 52 and their vicinities of the lower mold 42 and the upper mold 44 so as to be plastically deformed in correspondence with the shapes thereof, and the adjusting portions 86 and 92 are thereby formed. Therefore, even if there is dimensional error, the masks 80 and 82 can be reliably made to correspond to the lower mold 42 and the upper mold 44, respectively. Accordingly, even when there is a plurality of sets of the mold 40 which are essentially identical with each other, only the mask bodies 84 and 90 can be produced in large quantities by making the mask bodies 84 and 90 common, and thus, production cost for the masks 80 and 82 can be reduced. Since the production cost for the masks 80 and 82 considerably affects production cost for the steering wheel 10, if the production cost for the masks 80 and 82 can be reduced, the production cost for the steering wheel 10 can be considerably reduced.

Further, even when the molds 40 are not intended to mold the skin portion 20 of the identical steering wheel 10, if the molds 40 are relatively similar to each other, the mask bodies 84 and 90 can be made common. In this case, the production cost for the steering wheel 10 can be further reduced.

Molding Process for Skin Portion 20 of Steering Wheel 10

Next, operation and effects of the steering wheel 10 which is a molded product and those of a producing method thereof will be described through a molding process for the skin portion 20 of the steering wheel 10 using the masks 80 and 82 (i.e., a producing method of the molded product).

Figure 9A:
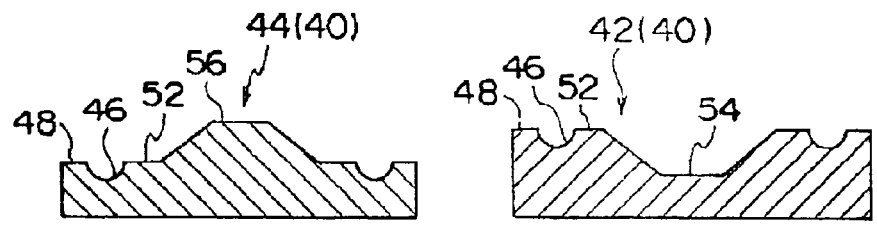
FIG. 9A is a schematic view of a process of molding a skin portion of a steering wheel, showing a state in which a mold is separated into the lower mold and the upper mold.
Figure 9B:
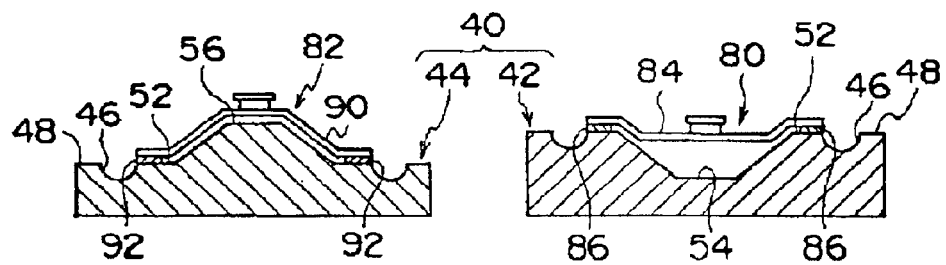
FIG. 9B is a schematic view of a process of molding the skin portion of the steering wheel, showing a mask mounting process.

In the steering wheel 10, when the skin portion 20 is formed around the core metal 12, initially in a masks mounting process, in a state in which the mold 40 for molding the skin portion 20 is separated into the lower mold 42 and the upper mold 44 (see FIG. 9A), the mask 80 is mounted to the lower mold 42 and the mask 82 is mounted to the upper mold 44 (see FIG. 9B). When the masks 80 and 82 are mounted to the respective molds, i.e., the lower mold 42 and the upper mold 44, the guide pins 60 provided at the lower mold 42 are inserted into the holes 88 formed at the mask body 84, and the pin 58 provided at the upper mold 44 is inserted into the hole 94 formed at the mask body 90. Accordingly, the mask 80 is positioned at the lower mold 42 and the mask 82 is positioned at the upper mold 44.

As described above, the mask bodies 84 and 90 are formed based on the masters 110 and 112. Since the masters 110 and 112 are formed by applying the FRP 116 to the lower mold 42 and the upper mold 44 on which the clay 114 has been laminated, the holes 88 and the hole 94 are formed in correspondence with the guide pins 60 and the pin 58 when the FRP 116 is applied. Although the masters 110 and 112 are thereafter polished and shaped by a router or a file, the holes 88 and the hole 94 can be accurately positioned with ease, and the masks 80 and 82 can be reliably mounted to the lower mold 42 and the upper mold 44, because the masters 110 and 112 are formed based on the lower mold 42 and the upper mold 44 as described above.

Further, the adjusting portions 86 and 92 are formed at the masks 80 and 82 normally by attaching the time-hardening members 132 to each of the mask bodies 84 and 90. The adjusting portions 86 and 92 are pressed toward the lower mold 42 and the upper mold 44 in the adjusting portion forming process, and thereby plastically deformed in correspondence with the shapes of the parting surfaces 52 and their vicinities of the lower mold 42 and the upper mold 44. Therefore, when the masks 80 and 82 are mounted to the lower mold 42 and the upper mold 44, the parting surfaces 52 sides of the adjusting portions 86 and 92 of the masks 80 and 82 get tight contact with the parting surfaces 52 and their vicinities so that substantially no gap exists therebetween. Accordingly, the parting surfaces 52 and their vicinities are covered with the masks 80 and 82.

Figure 9C:
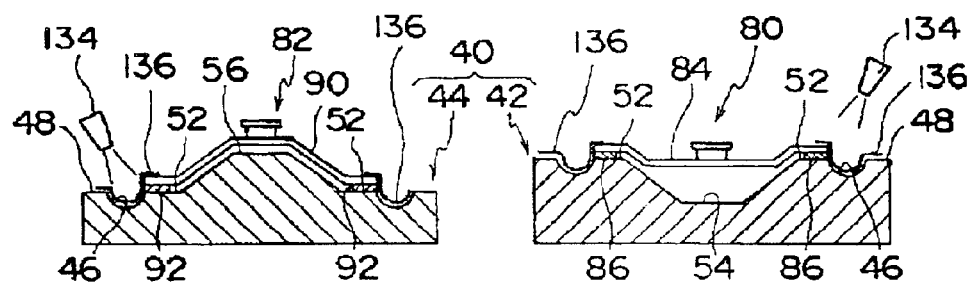
FIG. 9C is a schematic view of a process of molding the skin portion of the steering wheel, showing an applying process.

Then, in an applying process, for example, a releasing agent is applied to the rim molding portion 46 and the spoke molding portions 50 (not shown in FIGS. 9A, 9B and 9C) of each of the lower mold 42 and the upper mold 44 by using a spray gun or the like, in a state in which the masks 80 and 82 are mounted to the lower mold 42 and the upper mold 44. Further, as shown in FIG. 9C, a coating agent 136 is applied to the rim molding portion 46 and the spoke molding portions 50 of each of the lower mold 42 and the upper mold 44 by using a spray gun 134.

When the coating agent 136 is applied by the spray gun 134, the coating agent 136 is applied not only to the rim molding portion 46 and the spoke molding portions 50 but also to their vicinities. Therefore, the coating agent 136 is also applied to an outer portion of each of the lower mold 42 and the upper mold 44 than the rim molding portion 46, i.e., the parting surface 48 of each of the lower mold 42 and the upper mold 44. However, since the parting surfaces 52, which are at an inner side than the rim molding portion 46 and at lateral sides of the spoke molding portions 50 of each of the lower mold 42 and the upper mold 44, and their vicinities are covered with the masks 80 and 82, respectively, the coating agent 136 is prevented by the masks 80 and 82 from being applied to the parting surfaces 52 and their vicinities.

Figure 9D:
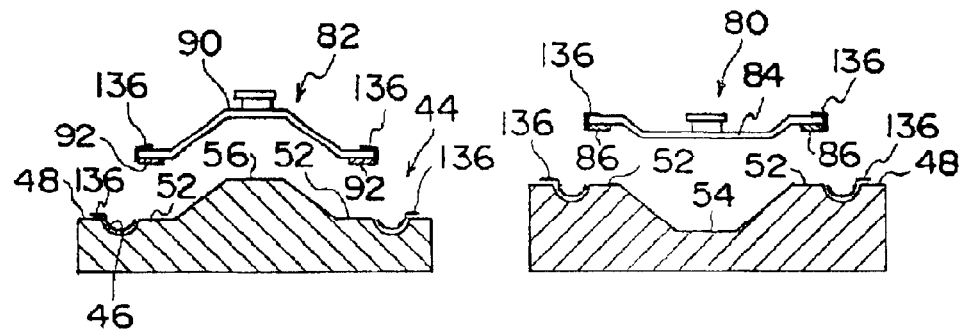
FIG. 9D is a schematic view of a process of molding the skin portion of the steering wheel, showing a mask removing process.

Then, as shown in FIG. 9D, in a mask removing process, the masks 80 and 82 are removed from the lower mold 42 and the upper mold 44. As a result, the first half of a process for clamping the mold 40 is completed.

Figure 10A:
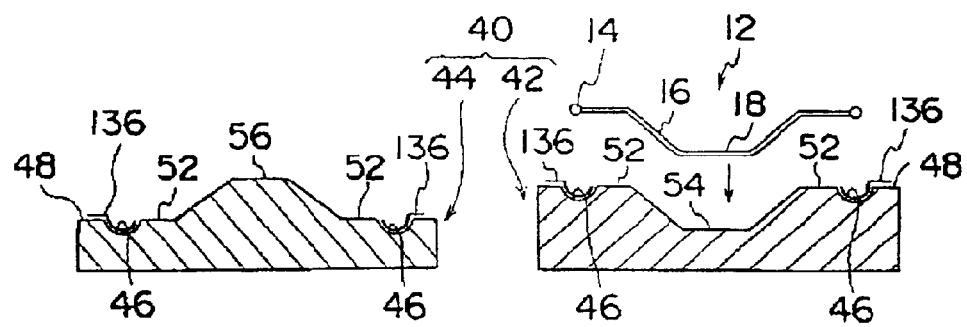
FIG. 10A is a schematic view of a process of molding the skin portion of the steering wheel, showing a state in which a core metal is mounted to the lower mold.
Figure 10B:
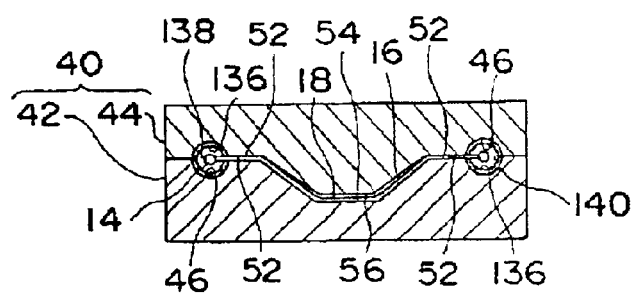
FIG. 10B is a schematic view of a process of molding the skin portion of the steering wheel, showing a state in which the lower mold and the upper mold are clamped together and a synthetic resin material for forming the skin portion is filled.
Figure 10C:
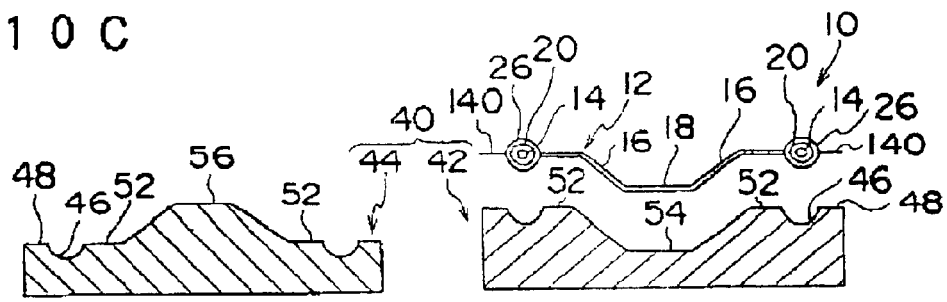
FIG. 10C is a schematic view of a process of molding the skin portion of the steering wheel, showing a state in which the steering wheel is removed from the mold.

After the above processes have been completed, in a core metal attaching process, as shown in FIG. 10A, the core metal 12 is attached to the lower mold 42. Then, in a clamping process, as shown in FIG. 10B, the lower mold 42 and the upper mold 44 are clamped together, and a synthetic resin material 138 such as an urethane resin, which is a molding material, is injected from a predetermined inlet. Further, when the synthetic resin material 138 has been hardened in the mold 40, the skin portion 20 is formed around the rim core metal 14 and around each portion of the spoke core metals 16 at the rim core metal 14 side than a longitudinal direction intermediate portion of the spoke core metal 16. When the synthetic resin material 138 is hardened, the coating agent 136, which has been applied to the rim molding portion 46 and the spoke molding portions 50 of each of the lower mold 42 and the upper mold 44, is transferred to the synthetic resin material 138 side so as to form the film-like coating 26. After the skin portion 20 has been formed (i.e., the synthetic resin material 138 has been hardened) in this manner, the mold 40 is opened (i.e., the mold 40 is separated into the lower mold 42 and the upper mold 44) again, and the core metal 12 around which the skin portion 20 has been formed, i.e., the steering wheel 10, is removed (see FIG. 10C).

At a portion of the removed steering wheel 10 corresponding to the parting surfaces 48 of the lower mold 42 and the upper mold 44, a flange 140 is formed by extruding the synthetic resin material 138 for the skin portion 20. The coating agent 136 which has been applied to the parting surfaces 48 adheres to the flange 140 so as to form flash. The flange 140 together with the coating agent 136 adhering thereto are cut off from the steering wheel 10 by putting a cutting tool such as a cutter onto the flange 140 and by manually or automatically rotating the cutting tool with respect to the steering wheel 10 around the center thereof.

If the coating agent 136 is applied to the parting surfaces 52, flash due to the coating agent 136 is formed at an internal periphery side (the parting surfaces 52 side) of the skin portion 20, and a portion corresponding to the flange 140 is formed at the internal periphery side of the skin portion 20 in order to support the flash, another cutting operation is required to cut off the portion corresponding to the flange 140 together with the flash, as might be expected.

However, the spoke core metals 16 exist at the internal periphery side of the skin portion 20, different from the parting surface 48 side thereof. Since the skin portion 20 is also formed at portions of the spoke core metals 16 such that the shape thereof is complicated, the portion corresponding to the flange 140 cannot be cut off merely by placing and rotating a cutting tool. Thus, these forming and cutting operations for the portion corresponding to the flange 140 at the parting surfaces 52 side of the skin portion 20 are more complicated and require more processes than the cutting operation for the flange 140.

As described above, when the coating agent 136 is applied, the masks 80 and 82 have been mounted to the lower mold 42 and the upper mold 44, and the parting surfaces 52 have been covered with the masks 80 and 82. Therefore, the cutting operation is not required to cut off the flash due to the coating agent 136 at the parting surfaces 52 side of the skin portion 20, which is different from the parting surface 48 side thereof. Further, at the parting surfaces 52 side of the skin portion 20, the flash is not formed, and thus, the portion corresponding to the flange 140 is not required to be formed. Accordingly, the producing processes for the steering wheel 10 can be considerably reduced, and the production cost therefor can be also considerably reduced.

As described above, in this embodiment, the parting surfaces 52 are covered with the masks 80 and 82 essentially formed in correspondence with the parting surfaces 52, and the parting surfaces 48 are not covered with the masks so that the flange 140 is formed by applying the coating agent 136. However, the parting surfaces 48 may be also covered with masks formed in correspondence with the parting surfaces 48 of the lower mold 42 and the upper mold 44.

In the above embodiment, the present invention is used to form the coating 26 when the skin portion 20 of the steering wheel 10 is molded. However, the present invention is not limited to the above embodiment. Basically, the present invention can be widely used in general to apply a coating onto a surface of a molded product during molding. For example, with regard to vehicles, the present invention can be sufficiently used to apply a coating to a knob or a lever of a shift lever device, a housing of a shift lever device, a lever for direction indictors or wipers, and the like. Further, with regard to objects other than vehicles, the present invention can be also used to apply a coating to a body or a casing of an audio unit, a personal computer or a portable telephone, and the like.

Further, in this embodiment, the coating 26 has weather-resistance and wear-resistance. However, the coating 26 may have other properties such as antibacterial properties. The coating referred in the present invention is used not only to provide the weather-resistance and the wear-resistance, the antibacterial properties or the like but also to provide a paint.

In this embodiment, the present invention is used for so-called resin molding using the synthetic resin material 138. However, the present invention can be used not only for molding materials with limited properties and forms (liquid, solid, powder or the like) but also for powder metallurgy molding or the like.

Furthermore, in this embodiment, since the synthetic resin material 138 is used, the synthetic resin material 138 serving as a molding material is injected into the mold 40 after the coating agent 136 applying process and the clamping process have been completed. However, as long as the coating agent 136 applying process (the masks 80 and 82 mounting process) is conducted before the molding material injecting process, the molding material injecting process may be conducted before the clamping process. Namely, in other embodiments such as powder metallurgy molding, the molding material injecting process is conducted before the clamping process, differently from this embodiment.

As described above, in the molded products according to the present invention or those produced by using the producing method thereof according to the present invention, even if the coating agent is applied to the mold, the coating agent is not applied to the parting surfaces thereof. Therefore, flash due to the coating agent being applied to the parting surfaces is not formed at the molded products. Accordingly, a cutting operation for the flash is not required, and thus, the production cost can be reduced.

The coating agent is not applied to the parting surfaces of the mold by mounting the parting surface covering masks according to the present invention to the mold when the coating agent is applied. Therefore, flash due to the coating agent being applied to the parting surfaces is not formed at the molded products. Accordingly, a cutting operation for the flash is not required, and thus, the production cost for the molded product can be reduced.

Moreover, in the producing method of the parting surface covering masks according to the present invention, the parting surface covering masks can be easily and inexpensively formed, and thus, the production cost for the molded product can be reduced.

What is claimed is:

1. In a molding machine for molding steering wheels, the improvement comprising: a mask for covering parting surfaces of steering wheel molding members, the mask being mountable to a coated-portion steering wheel molding members corresponding to portions of a molded steering wheel surface on which a coating is formed, before a molding material which forms the molded steering wheel is filled into a mold composed of a plurality of steering wheel molding member components, with molding portions being formed at some of the molding member components, the mask having a shape that corresponds to the surface shape of the coated-portion steering wheel molding member, wherein the mask has a peripheral portion covering parting surfaces of the coated-portion steering wheel molding member in the state in which the mask is mounted to the coated-portion molding member, and preventing the formation of flash around a periphery of a molded steering wheel from said coating.

2. The improved apparatus of claim 1, wherein the mask further comprises:

mask bodies, whose peripheries correspond to peripheries of the parting surfaces and whose portions facing the parting surfaces are formed in correspondence with the parting surfaces; and adjusting portions, which are fixed to at least the peripheries or the facing portions of the mask bodies, and whose portions fixed to the mask bodies are formed in correspondence with shapes of the parting surfaces.

3. The improved apparatus of claim 2, wherein the adjusting portions of the mask are formed by time-hardening members hardened after an elapse of predetermined period of time, wherein the time-hardening members can tightly contact the mask bodies, can be plastically deformed and partially cut off by an external force applied thereof, and are integrally bonded to the mask bodies by hardening while adhering to the mask bodies.

4. The improved apparatus of claim 3 wherein the mask, further comprises engaging portions, which engage with predetermined portions of the coated-portion molding members in the state in which the masks are mounted to the coated-portion molding members are held by the coated-portion molding members.

5. The improved apparatus of claim 4, wherein the mask bodies are molded out of a hard synthetic resin material.

6. The improved apparatus of claim 1, wherein said peripheral portion is circular.

7. The improved apparatus of claim 1, wherein said peripheral portion is formed from a rigid material.

8. The improved apparatus of claim 1, wherein said mask includes at least one member for removably mounting said peripheral portion to said molding members.

9. The improved apparatus of claim 1, wherein said mask includes at least one gripping portion.

10. The improved apparatus of claim 1, wherein said mask includes a concave or convex central portion.

11. A mask for covering parting surfaces, the mask being mountable to molding members corresponding to portions of a molded body surface on which a coating is formed, before a molding material which forms the molded body is filled into a mold composed of a plurality of molding member components, with molding portions being formed at some of the molding member components, the mask having a shape that corresponds to the surface shape of the coated-portion molding member, wherein the mask is formed by using the coated portion molding member, and covers parting surfaces of the coated-portion molding member in the state in which the mask is mounted to the coated-portion molding member, said mask including mask bodies, whose peripheries correspond to peripheries of the parting surfaces and whose portions facing the parting surfaces are formed in correspondence with the parting surfaces; and adjusting portions, which are fixed to at least the peripheries of the facing portions of the mask bodies, and whose portions fixed to the mask bodies are formed in correspondence with shapes of the parting surfaces, wherein the adjusting portions are formed by time-hardening members hardened after an elapse of predetermined period of time, wherein the time-hardening members can tightly contact the mask bodies, can be plastically deformed and partially cut off by an external force applied thereof, and are integrally bonded to the mask bodies by hardening while adhering to the mask bodies.

* * * * *